United States Patent [19]

Gentry et al.

[11] Patent Number: 5,659,758

[45] Date of Patent: Aug. 19, 1997

[54] INTERRUPT MODULAR FOR RECEIVING BURSTY HIGH SPEED NETWORK TRAFFIC

[75] Inventors: Denton Gentry, Palo Alto; Rasoul M. Oskouy, Fremont, both of Calif.

[73] Assignee: Sun Microsystems, Inc., Mountain View, Calif.

[21] Appl. No.: 499,486

[22] Filed: Jul. 7, 1995

[51] Int. Cl.$^6$ ........................................... G06F 9/46
[52] U.S. Cl. .............................. 395/733; 370/229
[58] Field of Search ........................ 395/733, 200.01, 395/885

[56] References Cited

U.S. PATENT DOCUMENTS

| | | | |
|---|---|---|---|
| 5,293,635 | 3/1994 | Faulk, Jr. et al. | 395/200 |
| 5,475,816 | 12/1995 | Yonezawa et al. | 395/200.06 |
| 5,493,646 | 2/1996 | Guttag et al. | 395/164 |
| 5,581,705 | 12/1996 | Passint et al. | 395/200.13 |
| 5,598,580 | 1/1997 | Detschel et al. | 395/855 |

*Primary Examiner*—Jack B. Harvey
*Assistant Examiner*—David A. Wiley

*Attorney, Agent, or Firm*—Blakely Sokoloff Taylor & Zafman

[57] ABSTRACT

Interrupts are presented to a processor to indicate the arrival of data packets from a high speed network. The rate of packet arrival interrupts is modulated to prevent burdening the processor unnecessarily with repeated interrupts while receiving a burst of data. The interrupt modulator of the present invention ensures that the first packet of a new data burst, or the first packet of a short message, generate an immediate interrupt to the processor, thus avoiding any unnecessary latency in the processor's response. This is done by enabling a packet arrival to generate an interrupt if a specified period of time has elapsed since the previous interrupt. Further, the interrupt modulator ensures that every N'th packet that arrives generates an interrupt—for example, to ensure that the processor performs any memory management functions that may be required. A packet does not generate an interrupt if it arrives soon enough after the previous interrupt and it is not the N'th packet since the pervious interrupt. This lowers the interrupt rate due to the arrival of a burst of data, thus enhancing processor and system performance.

18 Claims, 6 Drawing Sheets

INTERRUPT MODULAR FOR RECEIVING BURSTY HIGH SPEED NETWORK TRAFFIC

FIELD OF THE INVENTION

The present invention relates generally to the architecture of interrupt systems that interface digital computers to high speed networks. In particular, it relates to methods and apparatus for modulating the rate of packet arrival interrupts to avoid burdening the processor with excessive interrupts during receipt of a burst of network data.

BACKGROUND OF THE INVENTION

The data transfer rate achievable over a high-speed network has steadily increased. Today local area networks based on the Ethernet standard are widespread. Ethernet was initially specified in the late 1970's. It supports data transfer rates of 1 to 10 Mbits per second (at the physical layer—the transfer rate effectively usable for user data is substantially lower).

In typical computer networks, Ethernet data can be received at a maximum rate of one packet per every 12 milliseconds. When a packet of data arrives within a computer system, it is often necessary for it to come to the attention of the processor in a timely manner. A packet of data received over a high speed network could be, for example, audio or video information for the computer system to reproduce in real time, a command for the processor to perform, or a part of a data file for an applications program.

Recently, substantial activity designing high speed networks has been focused on both local area and long distance networks based on the Asynchronous Transfer Mode (ATM) Standard. ATM network standards have been defined for transmitting over optical fiber lines at rates of 51.8 to 2488 Mbits per second.

Computer data is often transmitted over an ATM network according to the ATM Adaptation Layer 5 (AAL5) standard. AAL5 provides for transmitting data in packets of variable length, up to a maximum of 64 KBytes per packet.

For many applications, it is desirable that a computer system include a mechanism that interrupts the normal execution of its processor when a network data packet arrives. However under such a scheme, as the speed of the network increases, so does the interrupt rate. It may be quite acceptable to incur one interrupt for every Ethernet packet, which requires at least 12 millisecond per packet.

But one interrupt for every AAL5 packet may be unacceptable. For example, an optical fiber ATM line operating at 155 Mbits per second can at most carry approximately one 64 KByte AAL5 packet in each 3.9 millisecond period, one 9 KByte packet in each 544 microsecond period, or one 512 byte AAL5 packet in each 30 microsecond period. A 622 Mbits per second line operating at full speed requires approximately 970 microseconds per 64 KByte packet, 136 microseconds per 9 KByte packet, or 7.5 microseconds per 512 byte packet.

A processor being interrupted at the AAL5 packet arrival rates would suffer potentially severe performance degradation just from the time required to suspend its current process, save the context of that process (the values currently in registers, for example), decide whether or not an immediate response is needed to the interrupt, respond if necessary, restore the saved context, and resume the interrupted process. A typical processor may require around 12 to 20 us to process a network packet arrival interrupt.

For many applications, it is desirable that a computer system include a mechanism that allows its processor to poll to see if a network data packet has arrived. However under such a scheme, as the utilization of the network decreases, the unproductive overhead imposed on the processor increases. That is, if there is little data traffic over the network, then the processor spends a significant amount of time querying to see if a new packet has arrived, only to find out that none has. A typical processor may require on the order of 0.5 microsecond for an unsuccessful network packet arrival poll. A computer system performing computations or local input/output activity, for example, could go for hours receiving only an insignificant number of network data packets.

Thus there is a need to modulate the rate at which a processor is interrupted due to data packets arriving from a high speed network such that polling is avoided during periods of light network activity but also such that excessive interrupts do not occur during bursts of high network activity. This need is particularly critical in the case of computer file transfers over a high speed network because such transfers are bursty in nature—the entire network bandwidth may be utilized during the period that a file or file segment is sent, but then there may be minimal network activity for a substantial period.

SUMMARY OF THE INVENTION

Interrupts are presented to a processor to indicate the arrival of data packets from a high speed network. The rate of packet arrival interrupts is modulated to prevent burdening the processor unnecessarily with repeated interrupts while receiving a burst of data.

The interrupt modulator of the present invention ensures that the first packet of a new data burst, or the first packet of a short message, generate an immediate interrupt to the processor, thus avoiding any unnecessary latency in the processor's response. This is done by enabling a packet arrival to generate an interrupt if a specified period of time has elapsed since the previous interrupt.

Further, the interrupt modulator ensures that every N'th packet that arrives generates an interrupt—for example, to ensure that the processor performs any memory management functions that may be required.

A packet does not generate an interrupt if it arrives soon enough after the previous interrupt and it is not the N'th packet since the pervious interrupt. This lowers the interrupt rate due to the arrival of a burst of data, thus enhancing processor and system performance.

Preferably both the period of time and the number of packets required for a packet arrival to generate an interrupt are programmable.

Preferably the data packets are not presented directly to the processor, but rather are placed into the main memory of the computer system via Direct Memory Access (DMA). The processor is kept informed of the current status of network data packet arrivals via a receive ring data structure maintained in main memory.

DETAILED DESCRIPTION OF THE INVENTION

Figure 1:
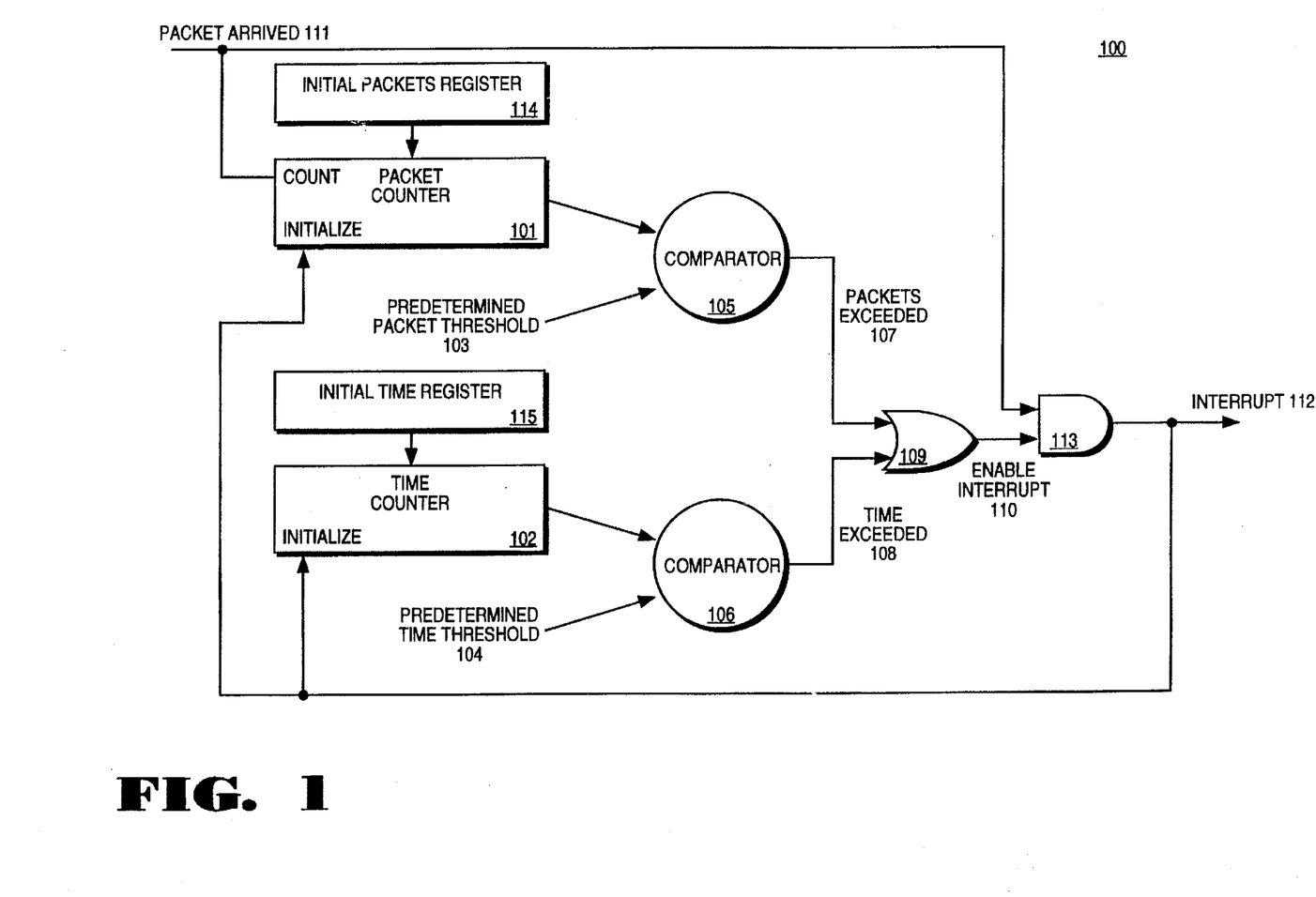
FIG. 1 shows the registers, counters, comparators and gates of the interrupt modulator of the present invention and their interconnections.
Figure 2A:
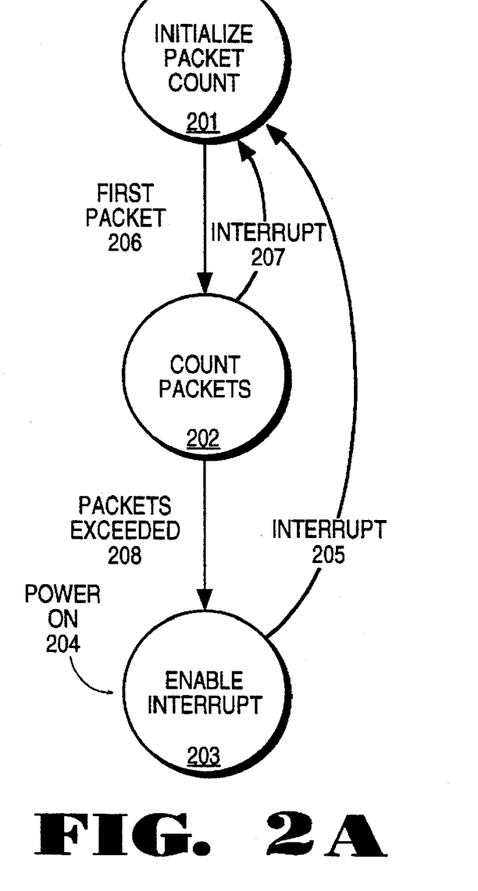
FIG. 2A shows the states that the interrupt modulator of the present invention goes through as it tracks the number of packets that have arrived since the last interrupt.
Figure 2B:
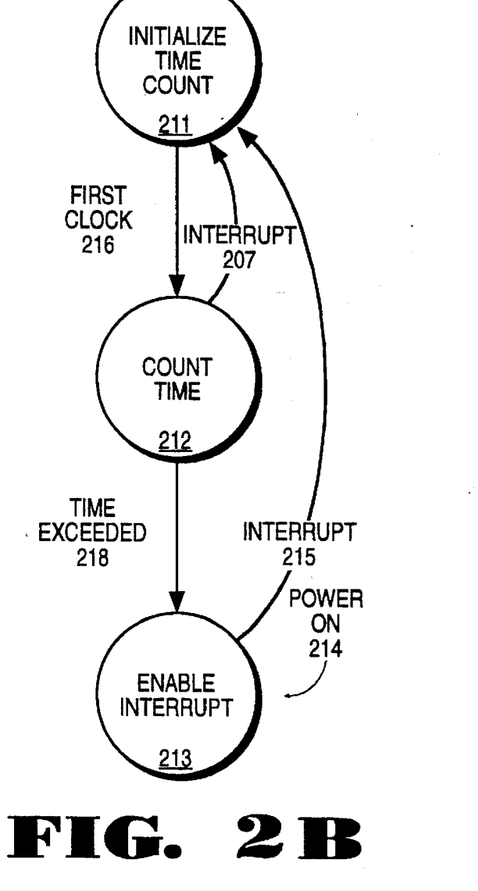
FIG. 2B shows the states that the interrupt modulator of the present invention goes through as it tracks the time that has passes since the last interrupt.

FIG. 1 shows a register transfer level diagram of the interrupt modulator of the present invention. FIG. 2A shows the transitions of the interrupt modulator into and out of its first enable interrupt state, which is based on receiving enough packets since the last interrupt. Interrupt modulator 100 is always in exactly one of the states shown in FIG. 2A. Simultaneously, interrupt modulator 100 is always in exactly one of the states shown in FIG. 2B. FIG. 2B shows the transitions of the interrupt modulator into and out of its second enable interrupt state, which is based on waiting enough time since the last interrupt. The following discussion refers to both FIG. 1 and FIG. 2.

When the power is turned on, or when a system reset occurs, packet counter 101 and time counter 102 are reset to values that respectively equal the value of predetermined packet threshold 103 and predetermined time threshold 104. This corresponds to power on transitions 204 and 214, respectively into enable interrupt states 203 and 213. In the preferred embodiment, both packet counter 101 and time counter 102 cease to increment once they contain all ones. Thus, interrupt modulator 100 will remain in enable interrupt states 203 and 213 until the first packet arrives, which is enabled to cause an interrupt. It is very desirable that the first packet of a new burst, or a single packet message, cause an interrupt without delay so that the processor can receive the packet data with minimal latency.

Comparator 105 compares the current value of packet counter 101 with predetermined packet threshold 103 and generates packets exceeded signal 107 if they are equal. Packets exceeded signal 107 being active corresponds to enable interrupt state 203.

Similarly, comparator 106 compares the current value of time counter 102 with predetermined time threshold 104 and generates time exceeded signal 108 if they are equal. Time exceeded signal 108 being active corresponds to enable interrupt state 213.

Figure 3:
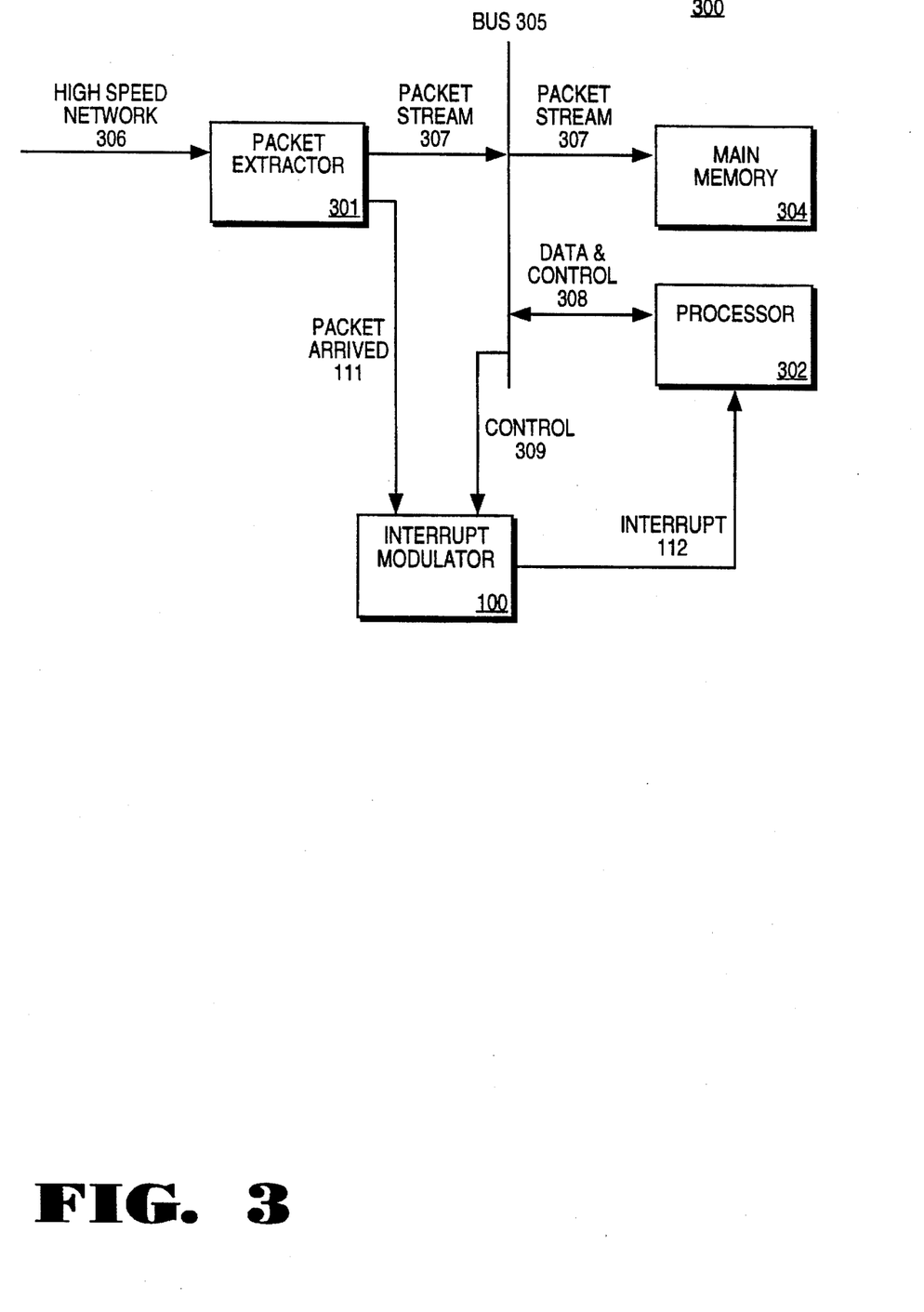
FIG. 3 shows a preferred technique for using the interrupt modulator of the present invention within a computer system.

OR gate 109 generates enable interrupt signal 110 based on either packets exceeded signal 107 or time exceeded signal 108 being active. Enable interrupt signal 110 enables packet arrived signal 111 to generate interrupt signal 112 through AND gate 113. Packet arrived signal 111 is generated by packet extractor 301, and interrupt signal 112 is coupled to processor 302 (FIG. 3).

Packet arrived signal 111 indicates that a complete packet has been received. Packet arrived signal 111 corresponds with interrupt transitions 205 and 215, which respectively transition interrupt modulator 100 into initialize packet count state 201 and initialize time count state 211.

Interrupt signal 112 is also coupled to the initialize inputs of packet counter 101 and time counter 102. In response thereto, packet counter 101 and time counter 102 are respectably loaded from initial packets register 114 and initial time register 115.

Upon the next occurrence of a clock signal (not shown), time counter 102 increments its value. This corresponds to first clock transition 216, which transitions interrupt modulator 100 into count time state 212. In this state, time counter 102 continues to count occurrences of the clock signal. In the preferred embodiment, the clock signal is 12.8 microseconds and time counter 102 is 10 bits wide, thus allowing the delay to be programmable from zero to approximately 6.5 milliseconds.

Similarly upon the next occurrence of packet arrived signal 111, packet counter 101 increments its value. This corresponds to first packet transition 206, which transitions interrupt modulator 100 into count packets state 202. In this state, packet counter 101 continues to count occurrences of packet arrived signal 111. In the preferred embodiment, time counter 101 is 3 bits wide, thus allowing a maximum of 7 packets to be received before the next packet arrival interrupts the processor.

As time passes, the value in time counter 102 will become equal to predetermined time threshold 104, thus causing comparator 106 to generate time exceeded signal 108. This causes interrupt modulator 100 to take time exceeded transition 218 into enable interrupt state 213. In this state, the next packet that arrives will generate interrupt signal 112.

Similarly, as packets continue to arrive, the value in packet counter 101 will become equal to predetermined packet threshold 103, thus causing comparator 105 to generate packets exceeded signal 107. This causes interrupt modulator 100 to take packets exceeded transition 208 into enable interrupt state 203. In this state, the next packet that arrives will generate interrupt signal 112.

In the preferred embodiment, packet counter 101 is 3 bits wide, time counter 102 is 10 bits wide and each include circuitry to inhibit counting once the predetermined threshold is reached. Also, in the preferred embodiment all ones are used for the predetermined and the reset values, i.e. predetermined packet threshold 103 is 7h ("h" denoting hexadecimal) and predetermined time threshold is 3FFh. In the preferred embodiment, it happened that a comparator to all ones could be inexpensively implemented and that an up counter was less expensive to implement than a down counter.

It will be obvious to one skilled in the art that interrupt modulator 100 includes many design choices and implementation alternatives that could be altered from the preferred embodiment described herein without departing from the spirit or the scope of the present invention. For example, the clock rate could be changed, the counter size or direction could be changed, the counters could continue to count after reaching the threshold, the threshold values could be made programmable, the initial values could be made predetermined, etc.

FIG. 3 shows the system-level architecture of one preferred manner of interconnecting interrupt modulator 100 within computer system 300. Computer system 300 would likely have other components, but those shown in FIG. 3 are most germane to interrupt modulator 100.

In the preferred embodiment, high speed network 306 is an ATM network. It will be obvious to one skilled in the art that high speed network 306 includes many design choices and implementation alternatives that could be altered from the preferred embodiment described herein without departing from the spirit or the scope of the present invention. For example, high speed network 306 could be a Broadband Integrated Services Digital Services Network (B-ISDN), or a fiber channel network. Further, it could be a high speed legacy LAN, such as Fiber Distributed Datalink Interface (FDDI), Copper Distributed Datalink Interface (CDDI), or fast Ethernet.

Packet extractor 301 receives a signal from high speed network 306. Packet extractor 301 operates on that signal to generate packet stream 307, which comprises the data packets extracted from high speed network 306. Packet extractor 301 is preferably implemented in an application specific integrated circuit (ASIC) that also contains interrupt modulator 100. Preferably, the ASIC also contains network transmission capabilities so that computer system 400 can send information over high speed network 306. Also, packet extractor 301 operates on the receive signal from high speed network 306 to generate packet arrived signal 111. Each occurrence of packet arrived signal 111 indicates that a newly arrived packet is now complete.

In the preferred embodiment, packet extractor 301 does not provide packet stream 307 directly to processor 302. Rather, it places the packets received into main memory 304 over bus 305 using DMA techniques, as are well known in the art.

Processor 302 is preferably kept informed of the current status of network data packet arrivals via a receive ring data structure (not shown) that packet extractor 301 maintains in main memory 302. In the preferred embodiment, this receive ring data structure is a buffer of 4K 32-bit words, comprising 1K descriptors of 4 words each. When the last descriptor in this buffer is used, it wraps around in a circular manner so that the first descriptor is overwritten or reused. A semaphore bit within each descriptor is set by software to indicate that hardware now owns the descriptor and its corresponding buffer, the size and address of which is specified in the descriptor. After filling a buffer with arriving data packet information, the hardware clears the semaphore bit in the associated descriptor, thus signaling that the data is now available and that software now owns the descriptor and buffer.

Although not shown in FIG. 3, processor 302 preferably uses bus 305 to obtain access to and to control both main memory 304 and packet extractor 301. Processor 302 can set and alter the values of initial packets register 114 and initial time register 115 via bus 305 and control 309, thus influencing the rate at which receives interrupt signal 112 from interrupt modulator 100. In the preferred embodiment, processor 302 is a SPARC™ processor manufactured by Sun Microsystems, Inc.

Figure 4:
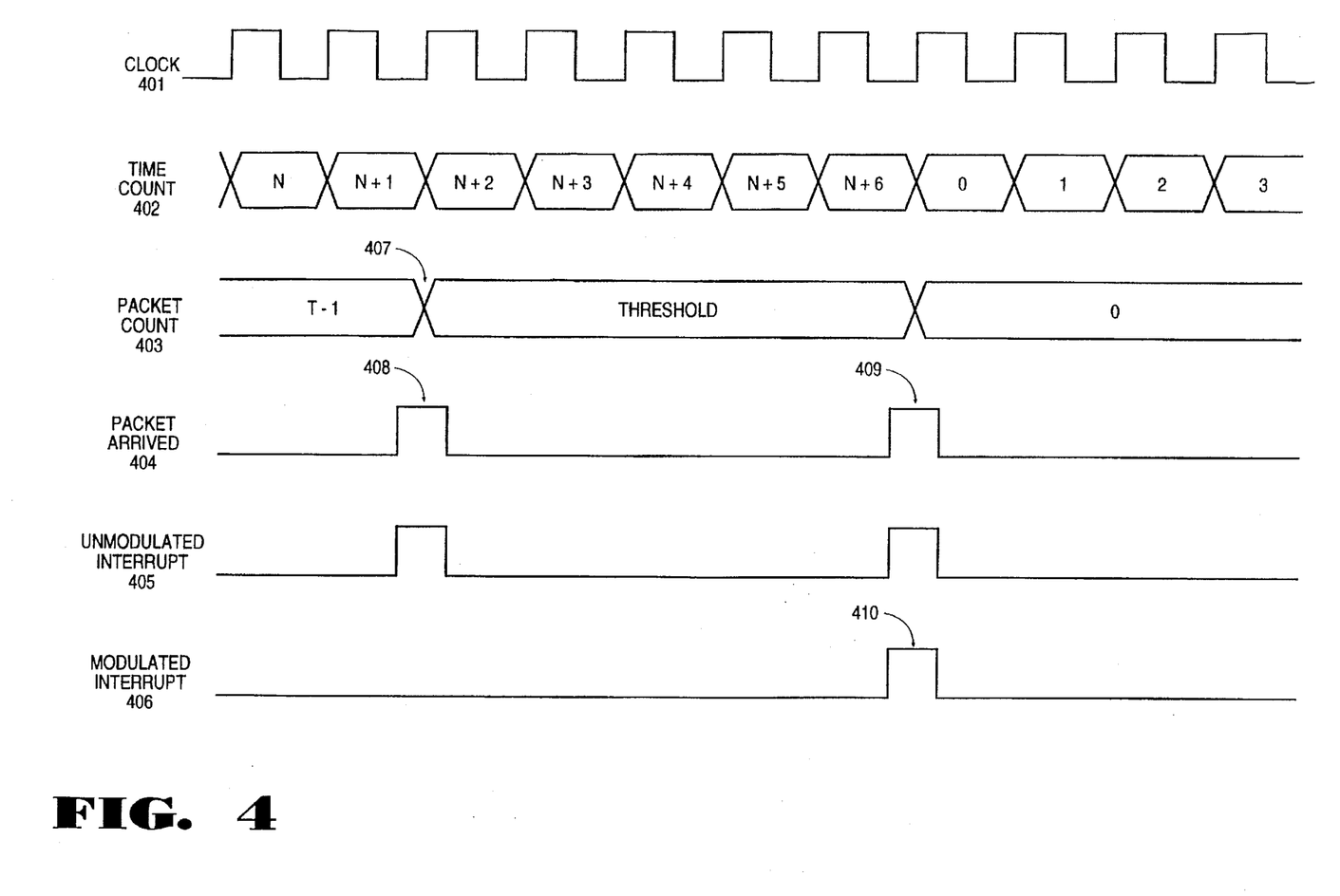
FIG. 4 shows the timing of how the present invention enables an interrupt due to the packet count reaching its threshold.

FIG. 4 is a timing diagram according to the present invention of an packet arrived interrupt being enabled due to the packet count reaching its threshold. The value of time count wave form 402 increments on each rising edge of clock wave form 401. The value of packet count wave form 403 increments on each positive pulse in packet arrived wave form 404, which corresponds to packet arrived signal 111.

Pulse 408 in packet arrived wave form 404 would produce an interrupt to processor 302 if it were not modulated, as shown in unmodulated interrupt wave form 405. According to the present invention, pulse 408 does not produce an interrupt signal, as shown in modulated interrupt wave form 406, which corresponds to interrupt signal 112. No interrupt is generated because interrupt modulator 100 is in count packets state 202 and count time state 212, i.e. neither threshold has been reached.

In contrast, pulse 409 in packet arrived wave form 404 does, according to the present invention, produce an interrupt signal, as shown in modulated interrupt wave form 406. This occurs because interrupt modulator 100 is in enable interrupt state 203, i.e. the packet count threshold was reached at point 407 in packet count wave form 403.

Figure 5:
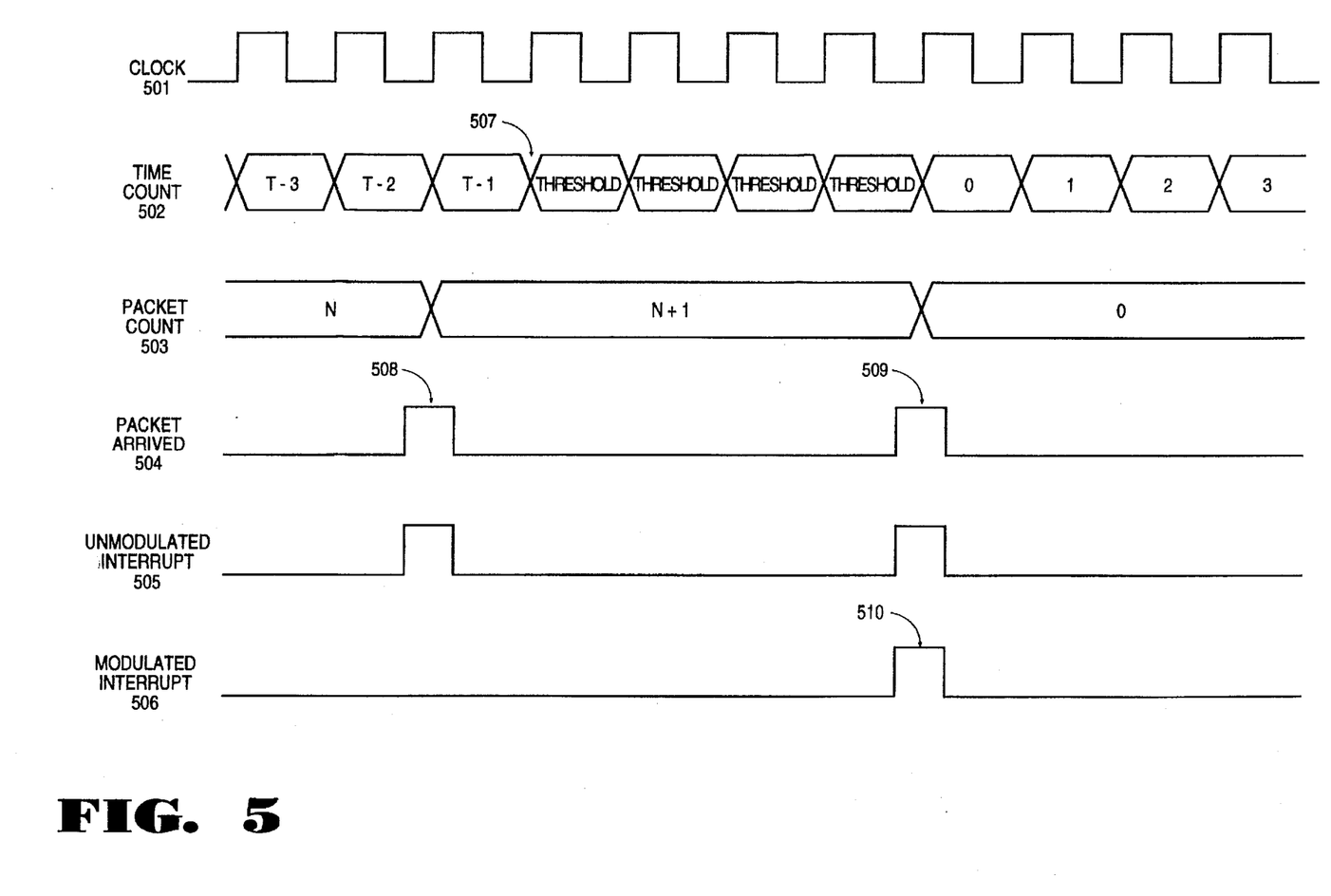
FIG. 5 shows the timing of how the present invention enables an interrupt due to the packet count reaching its threshold.

FIG. 5 is a timing diagram according to the present invention of an packet arrived interrupt being enabled due to the time count reaching its threshold. As was the case with FIG. 4, the value of time count wave form 502 increments on each rising edge of clock wave form 501. The value of packet count wave form 503 increments on each occurrence of packet arrived wave form 505, which corresponds to packet arrived signal 111.

Pulse 504 in packet arrived signal 504 would produce an interrupt to processor 302 if it were not modulated, as shown in unmodulated interrupt wave form 505. According to the present invention, it does not produce an interrupt signal, as shown in modulated interrupt signal 506, which corresponds to interrupt signal 112. This occurs because interrupt modulator 100 is in count packets state 202 and count time state 212, i.e. neither threshold has been reached.

In contrast, pulse 509 in packet arrived wave form 504 does, according to the present invention, produce an interrupt signal, as shown in modulated interrupt signal 506. This occurs because interrupt modulator 100 is in enable interrupt state 213, i.e. the time count threshold was reached as shown at point 507 in time count wave form 502.

Figure 6:
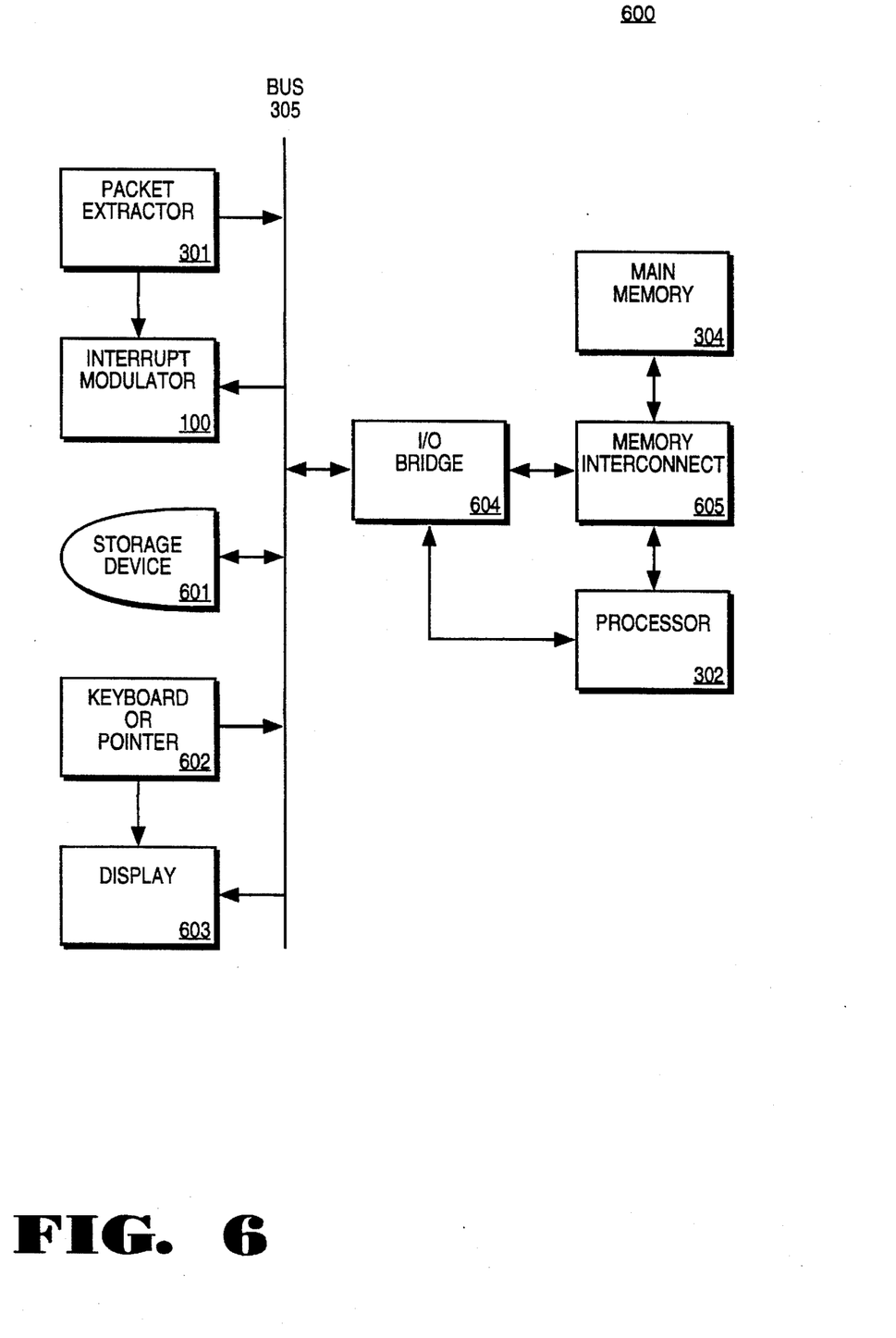
FIG. 6 shows the logical blocks of a general purpose computer system that includes the present invention.

FIG. 6 is an architectural block diagram of a general computer system 600 which includes a preferred embodiment of the present invention. The present invention is suitable for use in a wide variety of different designs for computer system 600. These designs may vary widely in the capacity and types of memory or storage, the number and types of input/output devices and the type of processor used.

Computer system 600 used by the preferred embodiment of the present invention typically comprises:
 (i) a bus 305 to communicate information;
 (ii) a processor 302 to process information according to instructions;
 (iii) a main memory 304 to store information and instructions for use by processor 302;
 (iv) a memory interconnect circuit 605 to connect main memory 304 with processor 302 and I/O bridge 604;
 (v) an I/O bridge 604 to connect bus 305 with processor 302 and main memory 304;
 (vi) a data storage device 601, connected to bus 300, to store information and instructions;
 (vii) a keyboard or pointer 602 to receive user input and communicate it via bus 305;
 (viii) a display 603 to provide information to the user;
 (ix) a packet extractor 301 to extract information packets from a signal received from a high speed network; and
 (x) an interrupt modulator 100, according to the present invention.

Processor 302 is preferably a SPARC™ processor manufactured by Sun Microsystems, Inc.

In alternative designs for computer system 600, data storage device 601 could be any medium for storage of computer readable information. Suitable candidates include a read-only memory (ROM), a hard disk drive, a disk drive with removable media (e.g. a floppy magnetic disk or an optical disk), a tape drive with removable media (e.g. magnetic tape), or a flash memory (i.e. a disk-like storage device implemented with flash semiconductor memory). A combination of these, or other devices for reading or writing computer readable media, could also be used.

Main memory 304 utilized with computer system 600 may comprise a random access memory (RAM) to store dynamic information and instructions for processor 302, a read-only memory (ROM) to store static information and instructions for processor 302, or a combination of both types of memory.

Display device 603 may be a liquid crystal device, cathode ray tube, or any other display device suitable for creating graphic images and alphanumeric characters recognizable to the user. Keyboard or pointer 602 may comprise a standard computer keyboard, a touch sensitive screen, and/or a cursor control device. A cursor control device, such as a trackball, mouse, joystick, allows the user to dynamically signal the two dimensional movement of a visible symbol, pointer or cursor on a display screen of display device 603.

Packet extractor 301 and interrupt modulator 100, as well as their interaction with processor 302, have been described above.

The preferred embodiment of the present invention and various alternative embodiments and designs are disclosed herein. Nevertheless, various changes in form and detail may be made while practicing the invention without departing from its spirit and scope or from the following claims.

We claim:

1. An interrupt modulator for interrupts indicative of packets received from a high speed network, comprising:
   (a) a time counter operable to hold a time count and to increment the same responsive to a clock signal;
   (b) a packet counter operable to hold a packet count and to increment the same responsive to a packet arrived signal indicating that a packet has arrived from said high speed network; and
   (c) an interrupt generator operable to generate an interrupt signal responsive to said packet arrived signal if either said time count exceeds a time threshold or said packet count exceeds a packet threshold;
   said time counter being responsive to said interrupt signal to set said time count to an initial time value;
   said packet counter being responsive to said interrupt signal to set said packet count to an initial packet value.

2. An interrupt modulator according to claim 1, wherein said high speed network is an ATM network.

3. An interrupt modulator according to claim 1, wherein said time threshold is predetermined.

4. An interrupt modulator according to claim 1, wherein said packet threshold is predetermined.

5. An interrupt modulator according to claim 1, further comprising
   (f) an initial time register operable to hold the current value of said initial time value.

6. An interrupt modulator according to claim 1, further comprising
   (f) an initial packet register operable to hold the current value of said initial packet value.

7. An interrupt modulator according to claim 1, further comprising:
   (f) a packet extractor operable to receive an network signal, to extract information packets from said network signal, and to generate said packet arrived signal as each said information packet is extracted;
   (g) a main memory to receive said information packets from said packet extractor; and
   (h) a processor operable to interrupt its normal execution in response to said interrupt signal.

8. An interrupt modulator according to claim 7, further comprising
   (f) an initial time register operable to hold the current value of said initial time value;
   said processor being further operable to alter said current value in said initial time register.

9. An interrupt modulator according to claim 7, further comprising
   (f) an initial packet register operable to hold the current value of said initial packet value;
   said processor being further operable to alter said current value in said initial packet register.

10. An interrupt modulator according to claim 7, wherein said high speed network is an ATM network.

11. A method of modulating the rate of interrupts indicative of packets received from a high speed network, comprising:
    enabling the arrival of a packet from a high speed network to generate an interrupt if the time elapsed since the preceding occurrence of said interrupt exceeds a time threshold;
    enabling said packet arrival to generate said processor interrupt if the number of said packets that have arrived since said the preceding occurrence of said interrupt exceeds a packet threshold; and
    otherwise disabling said packet arrival from generating said processor interrupt.

12. A method of modulating according to claim 11, wherein said high speed network is an ATM network.

13. An interrupt modulator for interrupts indicative of packets received from a high speed network, comprising:
    (a) a processor operable to process information according to instructions and to interrupt its normal execution in response to an interrupt signal;
    (b) a packet extractor operable to receive an network signal, to extract information packets from said network signal, and to generate a packet arrived signal as each said information packet is extracted;
    (c) a main memory to receive said information packets from said packet extractor and to hold information and instructions for said processor;
    (d) a storage device to hold information and instructions for said processor;
    (e) a keyboard or pointer to receive input from a user and to provide the same to said processor;
    (f) a display to provide information to a user under the control of said processor;
    (g) a time counter operable to hold a time count and to increment the same responsive to a clock signal;
    (h) a packet counter operable to hold a packet count and to increment the same responsive to said packet arrived signal; and
    (i) an interrupt generator operable to generate an interrupt signal responsive to said packet arrived signal if either said time count exceeds a time threshold or said packet count exceeds a packet threshold;
    said time counter being responsive to said interrupt signal to set said time count to an initial time value;
    said packet counter being responsive said interrupt signal to set said packet count to an initial packet value.

14. An interrupt modulator according to claim 13, further comprising (j) an initial time register operable to hold the current value of said initial time value;

said processor being further operable to alter said current value in said initial time register.

15. An interrupt modulator according to claim 13, further comprising (j) an initial packet register operable to hold the current value of said initial packet value;

said processor being further operable to alter said current value in said initial packet register.

16. An interrupt modulator according to claim 13, wherein said high speed network is an ATM network.

17. An interrupt modulator according to claim 13, wherein said time threshold is predetermined.

18. An interrupt modulator according to claim 13, wherein said packet threshold is predetermined.

* * * * *